United States Patent Office 2,759,877
Patented Aug. 21, 1956

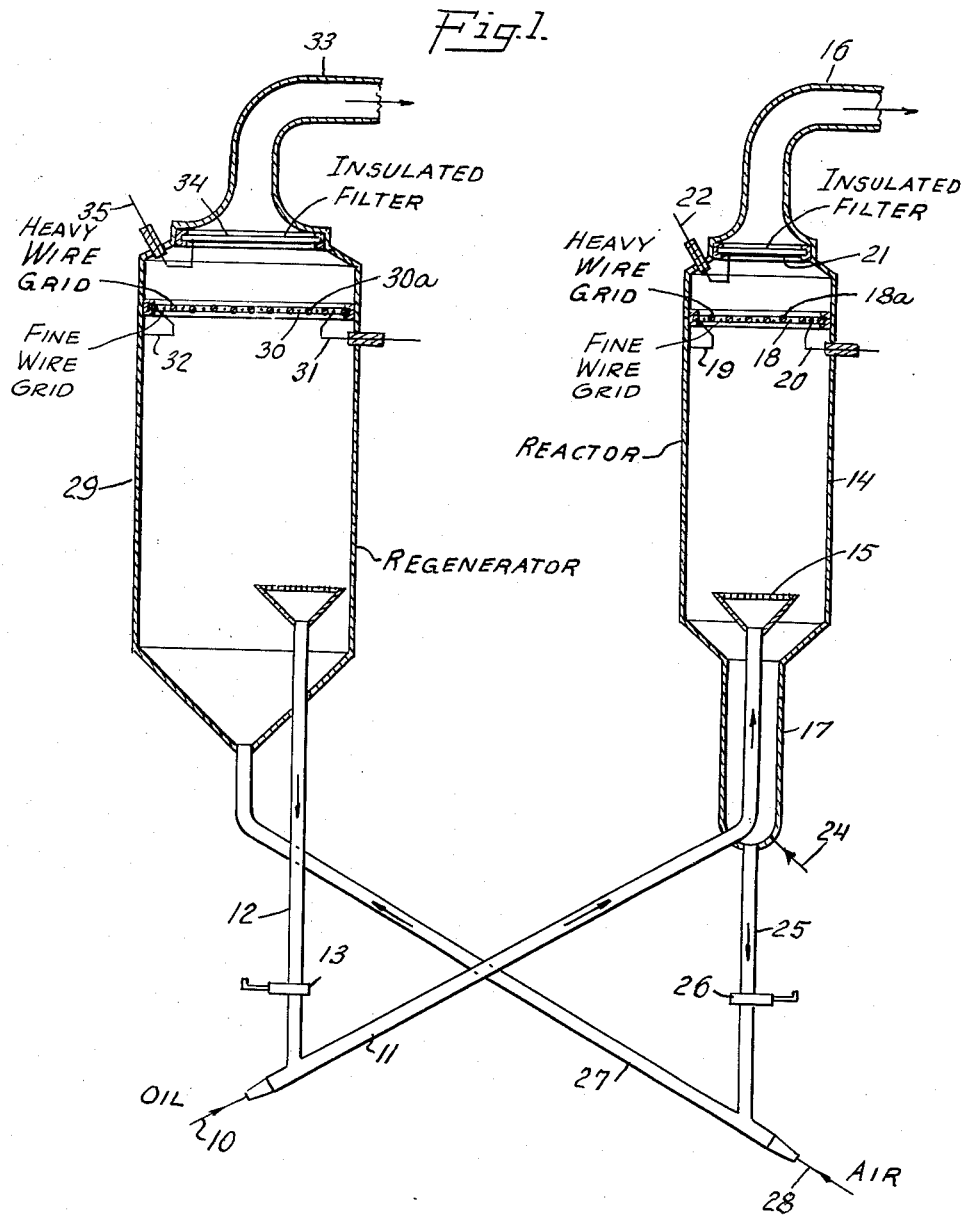

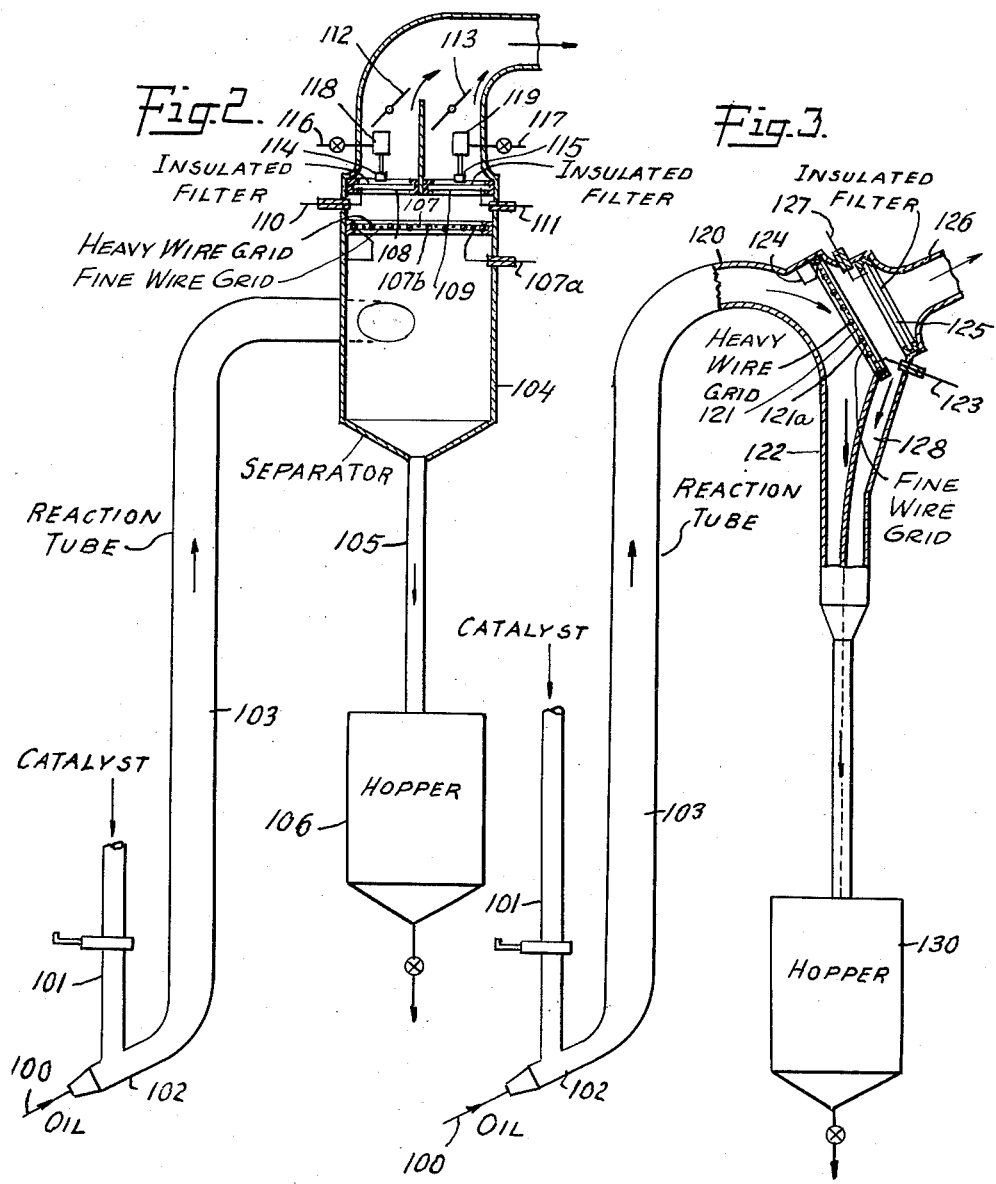

2,759,877

PROCESS AND SEPARATION APPARATUS FOR USE IN THE CONVERSIONS OF HYDROCARBONS

Alan H. Eron, East Chicago, Ind., assignor to Sinclair Refining Company, New York, N. Y., a corporation of Maine Application March 18, 1952, Serial No. 277,166

11 Claims. (Cl. 196—52)

My invention relates to process and apparatus for separating suspensions of finely divided solid particles in gases or vapors. My invention has particular application to the recovery of finely divided particles of solid adsorptive type catalysts employed in various petroleum refining processes such as catalytic cracking or reforming from suspension in reaction vapors or regeneration flue gases.

The problem of separating finely divided catalyst particles from suspension in gaseous streams has been an expensive and inevitable consequence of the application of fluid catalyst cracking to petroleum refining. Expensive dust collection equipment in the way of multiple cyclone separators and electrical precipitators of the Cottrell type have been necessary to maintain catalyst losses within a level tolerable from the economic standpoint and from the standpoint of minimizing atmospheric pollution. Nevertheless, catalyst losses with conventional dust collection equipment customarily run as high as 1½ to 2½ tons per day for a typical 25,000-barrel per day fluid catalyst unit. Such losses have been tolerated only because they roughly approximate the rate of fresh catalyst make-up necessary to maintain the customary equilibrium catalyst activity level associated with the use of natural clay catalysts. With a shift to more expensive synthetic cracking catalysts of higher activity and selectivity, excessive catalyst losses through entrainment in the flue gases leaving the regenerator or in the reaction vapors leaving the reactor soon impose a cost burden on the operation which greatly decreases or tends to cancel out entirely the advantages of using the newer synthetic catalysts. In the case of catalytic reforming, the problem of catalyst losses by entrainment is a primary factor preventing use of platinum on alumina catalysts in the more effective fluidized type contacting system. Obviously, the high cost of platinum requires that catalyst losses be minimized since the economics of the process requires reprocessing of all spent catalyst before discard to recover the platinum metal.

In addition to the direct economic losses associated with catalyst losses through entrainment, the increasing sensitivity of the public and the public health authorities to atmospheric pollution in municipal areas of industrial development have made this aspect of the problem increasingly serious to petroleum refiners.

I have now devised a system for separation of suspensions of finely divided solid particles in gas streams which provides an efficient and relatively inexpensive means in terms of capital and operating cost requirements for reducing catalyst losses through entrainment and which by reason of its flexibility in application permits significant modification in the design of refinery conversion equipment. It has been heretofore established that an electrostatic charge may be imparted to suspended solid particles by flowing a solids carrying gas stream through an ionizing electrostatic field between a discharging electrode and a grounded, non-discharging electrode. The discharging electrode is maintained at a high potential upwards of that required to cause the potential gradient of the field in the vincinity of the discharging electrode to exceed the ionization potential for the gaseous carrying medium producing at least corona discharge at the discharging electrode. In an up-flow system, a substantial portion of the solid particles are dropped out of suspension. The gas stream then is passed through a second and adjacent filtering electrostatic field between the grounded non-discharging electrodes and a third electrode made of a perforated material, which electrode is positioned in the path of the gases leaving the ionizing electric field. A higher potential of like polarity to that of the charged particles is impressed upon the third electrode and the suspended electrostatically charged solid particles which approach this field are repelled and thus are dropped out of suspension. The gas stream substantially free of entrained solids is withdrawn from the reaction zone or other zone of vapor-solids contact through the openings in the third electrode, while the disengaged solids may be returned to the main body of solid particles for separate handling. Although the efficiency of separation is very high, it is usually advisable to provide a mechanical collector such as a fine pore filter to collect the occasional particles that escape the influence of the electrical fields if 100% separation is desired.

My invention has application both to the reactor and regenerator of fluid catalyst cracking units. In the conventional fluid catalyst process, a primary function of the reactor and of the regenerator is to provide a large disengaging space above the body of catalyst maintained in the contacting vessel in the form of a dense phase fluidized reaction bed. The application of my invention permits a substantial reduction in the size of disengaging space necessary in the reactor and regenerator and at the same time eliminates the need for cyclone separators. Moreover, since the catalyst particles dropping back to the bed are of like charge, they tend to repel one another so that fluidization of the body of catalyst is promoted.

My invention has special value in application to catalytic cracking operations conducted in an elongated pipe or riser. In terms of future potentialities, riser cracking has great promise since it eliminates the fluidized bed as the primary reaction zone as well as the excessively large and expensive reaction vessels employed in the conventional process. The reaction is conducted in a progressive flow system in which a suspension of catalyst in oil vapors (or regeneration gas) is flowed as a stream through the elongated reaction tube so that back-mixing of reactants and feed is avoided and the catalyst values are more effectively and uniformly utilized. One of the great obstacles however to commercial installation of riser cracking has been the problem of effectively separating the suspended catalyst particles from the flowing vapor or gas stream. Without an effective catalyst separating device, it has been thought necessary to provide a catalyst disengaging chamber of relatively large cross-section approaching a conventional reaction vessel in size together with conventional cyclone separation and electrical precipitation equipment. Application of my invention to riser cracking permits riser cracking design obtaining its benefits while effecting very large reductions in capital investment compared to conventional fluid catalyst units, principally by eliminating the need for the tremendous reaction and regeneration chambers which require special fabrication, are expensive to install, require costly special foundation work and supporting structures and which are poorly adapted to elevated pressure operation.

The application of my invention to a fluid catalyst cracking system of the fluidized bed type is illustrated in the diagrammatic flow plan of Figure 1 of the accompanying drawings. The application of my invention to a riser system of catalytic cracking is illustrated in the diagrammatic flow plan of Figures 2 and 3 of the accompanying drawings.

In the system illustrated in Figure 1, preheated and vaporized oil charge is charged by connection 10 to reactor riser 11 in which it is admixed with hot freshly regenerated catalyst flowing from regenerator standpipe 12 under control of a slide valve 13. The resulting mixture of catalyst and oil vapors is charged to reactor 14 by means of reactor riser 11 and distributing cone and grid 15. A bed of catalyst particles in relatively dense phase fluidized condition is maintained in reactor 14. Reaction vapors with entrained catalyst rising from the catalyst bed leave the reactor 14 overhead through line 16 while spent catalyst settles from the lower portion of the bed into dependent annular stripping well 17.

In an upper portion of reactor 14 above the bed level, an ionizing electrostatic field is established across the reactor 14 by means of discharging electrode grid 18, which is supported in a manner insulating it from the reactor wall, and non-discharging electrode grid 18a. In construction, the grid 18 comprises a grid or screen of very fine wire, such as Nichrome or nickel, of about one centimeter to one inch spacing. The grid or screen 18a includes non-discharging ground wires or rods which may be alternately spaced from the discharging wires of the ionizing grid 18 or which may be situated below the fine wire screen 18 in the form of a second closely contiguous grid 18a. The rods of grid 18a may be grounded through the reactor wall as indicated by connection 19. Electrical connection 20 is provided connecting grid 18 with a suitable source of high potential electric power. Above the grids 18 and 18a and in the mouth of overhead line 16 is situated filter 21, an electrically conducting grid or other means for establishing a second electrostatic field, which is mounted in a manner completely insulating it from the walls of the vessel. The filter shown is a porous steel alloy plate of standard construction. Electrical connection 22 is provided from the filter 21 to a second source of electric power which should be of higher potential than that impressed on grid 18.

Spent catalyst is partially stripped of carbonaceous material in stripping well 17 by contact with steam injected as by connection 24. The stripped catalyst gravitates through reactor standpipe 25 under control of a slide valve 26 through regenerator riser 27 where it is picked up by a stream of regeneration air injected by connection 28. The resulting mixture is transported through regenerator riser 27 into regenerator 29. A relatively dense phase fluidized bed of catalyst particles controlling regeneration is maintained in regenerator 29. A stream of regenerated catalyst recirculates to the reactor 14 by gravitation through regenerator riser 12. The regenerator flue gases together with entrained catalyst particles leaving the upper level of the catalyst bed flow through an ionizing electric field established between wire grids 30 and 30a mounted in an upper portion of regenerator 29. Grid 30 is electrically insulated from the metal shell. The ionizing electrostatic field is impressed across the grids 30 and 30a by means of electrical connection 31 from grid 30 leading to a source of high potential. The grid 30a is grounded to the wall of regenerator 29 as by connection 32. The construction of grids 30 and 30a is similar to that of grids 18 and 18a of the reactor. Spaced a short distance above the grids 30 and 30a at the top of regenerator 29 near the mouth of overhead line 33 is a porous steel filter 34 which is supported in a manner electrically insulating it from the metal shell of the regenerator. Electrical connection 35 leading to a power source of high potential is provided.

In the operation of the system, reaction vapors of entrained catalyst flow through the ionizing electrostatic field impressed across the upper portion of reactor 14 by means of the fine wire ionizing discharging grid 18 which is connected suitably to a conventional source of high voltage electric power and by means of grounded non-discharging grid 18a. For example, an alternating current source of high potential may be employed connected through an electronic rectifier. The potential impressed across the reactor should be sufficient to result in a potential gradient in the vicinity of discharging grid 18 upwards of the ionization potential of the hydrocarbon medium and should be sufficient to produce corona discharge. The potential necessary to produce corona is a function of the spacing of grids 18 and 18a and of the pressure and is of the order of about 9,500 to 25,000 volts. The grid wire spacing may be about one centimeter to one inch between each strand of fine wire (grid 18), such as Nichrome or nickel, and a corresponding ground rod or wire (grid 18a). The bulk of the entrained catalyst particles entering the electrostatic field are repelled and fall back to the catalyst bed. The particles that do pass through the electrostatic field have a charge imparted to them. The suspended and electrostatically charged particles are then subjected to the influence of the second electrostatic field impressed across filter 21 as the vapor stream flows up into overhead line 16. Assuming that the electrostatically charged catalyst particles bear a negative charge, the second electrostatic field is charged negatively so that the suspended and electrostatically charged particles entering this field are repelled and returned by gravitation to the catalyst bed. The potential of the second electrostatic field should be substantially greater in magnitude than that of the ionizing grid. For example, filter voltages of up to 100,000 volts are desirable. The vapor stream leaving overhead line 16 is substantially free of entrained catalyst particles and is passed to the wall condensing and fractionating equipment comprising the product recovery section. The regenerator is operated in a similar manner, employing voltages of the same general order established in the first instance by the ionization potential on the flue gas mixture passing through grids 30 and 30a. The flue gas stream leaving regenerator 29 through overhead line 33 is substantially free of entrained catalyst and may be treated for waste heat recovery in the usual manner, before filtering through the stack.

In the system illustrated in Figure 2, a suspension of catalyst in oil vapors is formed by mixing the preheated charge oil from line 100 with hot regenerated catalyst dropping from catalyst standpipe 101 in a mixing and feed line 102. The resulting mixture of catalyst suspended in charge oil vapors is conducted as a stream through reactor tube 103 and is discharged tangentially as illustrated into separator 104. The suspension of catalyst in oil vapors is broken in separator 104 and the bulk of the catalyst particles settle by gravity to the bottom of the separator and into standpipe 105 from which they may be withdrawn to hopper 106. From this point, the spent catalyst may be handled by conventional stripping and regeneration means, or the regeneration may be effected in a similar type riser system.

Separated oil vapors rising through separator 104 pass through grid 107 which comprises a screen of fine wire, connected to a source of high potential electricity as by connection 107a, and a ground system 107b of interspaced or adjacently spaced rods. The grid system 107 is electrically insulated from the walls of separator 104. The bulk of the entrained catalyst particles which enter the electrostatic field drop back to the catalyst bed. The particles which remain in suspension in the rising oil vapors and pass through grids 107 and 107b have an electrostatic charge imparted to them. The gas stream is then flowed through a plurality of electrostatically charged filters 108 and 109, each of which is electrically insulated from the other and the walls of the container and each of which is connected, as by connections 110 and 111, to a source of high potential electrical energy. Electrostatically charged particles entrained in the gas stream passing through the filters are repelled by maintaining a charge of like polarity on filters 108 and 109.

A plurality of filters is provided since it is impossible as a practical matter to achieve perfect efficiency in the electrostatic separation. A few particles will require mechanical separation by the filter element and in the course of time, a thin cake of particles may build up on the filter surface. As described in pending application Serial No. 417,859 filed May 22, 1954, it is impossible to dislodge the cake of catalyst particles by mechanical vibration while the unit is in operation. Gas flow through the filter must be completely stopped if the cake is to be efficiently broken up and removed. Since it is obviously intolerable to shut down the operation of a continuous cracking unit for this purpose, multiple filters, as shown, equipped with valves 112 and 113, are provided respectively in the overhead lines. Mechanical tappers 114 and 115, actuated by air introduced through air ducts 116 and 117 to pistons 118 and 119, then may be provided so that either section can be shut down periodically by closing the valve to remove catalyst particles by actuating the mechanical vibrator.

In the system illustrated in Figure 3, a suspension of hot freshly regenerated catalyst particles in oil vapors is formed and conducted in a similar fashion in stream flow through vertically positioned reaction tube 103. A bend 120 is provided at the end of the reaction tube 103 so that the path of flow is shifted to an approximately downward direction. Grids 121 and 121a for establishing the first electrostatic field are situated in the wall of separation tube 122 in a position approximately paralleling the path of flow. As described before, the first electrostatic field is established by impressing a potential high enough to produce ionization in the gas stream between grids 121 and 121a. Connection 123 connects grid 121 to a source of high potential electric power. Grid 121 includes screen work of fine wire such as Nichrome. Grid 121a includes a system of ground rods grounded as by connection 124 to the tube wall so that an electrostatic field is set up between the fine wires and the ground rods whereby an electrostatic charge is imparted to catalyst particles that may pass in suspension in the gas stream withdrawn through the grids. A second electrostatic field is established, for example by means of filter or grid 125. The gas stream is flowed from grids 121 and 121a through filter 125 and thence through outlet pipe 126.

The radical change in the direction of gas flow from reaction tube 103 to separation tube 122 tends to drop the bulk of the suspended catalyst particles out of the gas stream through gravity and inertial force. Particles remaining in suspension or entrained in the gas stream receive an electrostatic charge as the gas stream bearing them is drawn through grids 121 and 121a. The charged particles then are repelled as they approach the second electrostatic field set up by filter 125 since this electrode carries a charge of like polarity and is of higher potential than the ionizing potential impressed on grid 121. Grid 125 is connected as by electrical connection 127 to a source of high potential electrical energy. The repelled particles drop from the gas stream and fall into separator tube 128. Alternatively separation tube 128 may be positioned at sufficient angle from the vertical to promote return of repelled particles as they are dropped out of suspension through the influence of the repulsion effect between the charge on the catalyst particles and the charge on grid 125. The catalyst particles in tube 122 and tube 128 pass separately to hopper 130 for transfer to succeeding catalyst handling operations.

The following data illustrate the effectiveness of solids separation from suspension in a flowing gas stream by means of electrostatic repulsion according to my invention. In the test, air was introduced into the bottom of a catalyst chamber containing a bed of fluid cracking catalyst in a manner fluidizing the bed. The air supply was controlled by passage through a rotameter, a pressure gauge and an air throttling valve. A dispersion plate was employed at the air outlet to improve fluidization. In the free space above the bed near the top of the tube a charging (ionizing) grid and associated ground plate were located and connected to a power source providing an ionizing voltage of approximately 9600 volts. The potential was sufficient to produce corona. Above the ionizing grid was located a stainless steel filter. A potential of about 30,000 volts was impressed on the stainless steel filter. The charge imparted to the particles entrained in the air flow was negative so that a negative potential was maintained on the steel filter. Pressure across the filter was measured by means of a manometer in order to observe whether entrained catalyst particles were passing through the electrostatic field and plugging the filter.

The data tabulated below illustrate results obtained in five runs. In run No. 1, both the ionizing and the filter voltages were employed. No appreciable plugging of the filter was observed for this run under the conditions set out below. Run No. 2 was performed under similar conditions except that neither the ionizing voltage nor the filter voltage was employed. The filter plugged immediately under these conditions. Run No. 3 was a duplicate of run No. 1 except that no filter voltage was used. It can be seen from the data that a somewhat higher pressure drop across the filter occurred indicating the repelling effect of the filter voltage. Run No. 4 was the same as run No. 1 except that a higher flow rate was employed. The water manometer measuring the pressure drop across the filter blew shortly after initiation of the run. Run No. 5 was a duplicate of run No. 4 except that a mercury manometer was substituted for the water manometer.

*Data sheet*

| Run No. | Time (Min.) | Manometer Reading | Ionizing Voltage | Filter Voltage | Rotameter Reading | Press., p. s. i. g. | Air Flow, S. C. F. M. |
|---|---|---|---|---|---|---|---|
| 1 | 0 | 56.3 cm. H₂O | 9,700 | 30,000 | 11 | 50 | 0.375 |
|   | 5 | 57.2 cm. H₂O | 9,600 | 30,000 | 11 | 50 | 0.375 |
|   | 10 | 58.3 cm. H₂O | 9,600 | 30,000 | 11 | 50 | 0.375 |
|   | 13 | Lost Filter Voltage Due to Transformer Arcing | | | | | |
| 2 | 0 | | 0 | 0 | 11 | 50 | 0.375 |
|   |   | Filter Plugged Immediately | | | | | |
| 3 | 0 | 60.2 cm. H₂O | 9,600 | 0 | 11 | 50 | 0.375 |
|   | 5 | 60.8 cm. H₂O | 9,600 | 0 | 11 | 50 | 0.375 |
|   | 5 | | | 0 | 15 | 60 | 0.550 |
|   |   | Plugged Filter on Increasing Air Rate | | | | | |
| 4 | 0 | 74 cm. H₂O | 9,600 | 30,000 | 15 | 60 | 0.550 |
|   |   | Blew Water Manometer | | | | | |
| 5 |   | 50.7 cm. Hg | 9,600 | 30,000 | 15 | 60 | 0.550 |

I claim:

1. A process for separating a suspension of finely divided solid particles in a gaseous stream which comprises flowing a gas stream containing suspended finely divided solid particles through an ionizing electrostatic field between a grounded non-discharging electrode and a discharging electrode, said discharging electrode having impressed thereon a potential sufficiently high to produce corona discharge and to ionize the gas stream whereby the solid particles have an electric charge imparted to them, then flowing the gaseous stream containing charged particles in suspension through a perforated third electrode having an impressed potential of like polarity to the charge on the solid particles and higher than the potential impressed at the discharging electrode, whereby the electrostatic field generated by the third electrode causes the charged particles to be repelled and dropped from suspension in the gas stream.

2. An apparatus for separating a gaseous suspension of finely divided solid particles which comprises a conduit having an inlet and outlet, a discharging electrode grid positioned across said conduit, a non-discharging electrode grid positioned across said conduit adjacent to said discharging electrode grid and grounded to said conduit, means for impressing a high potential on said discharging grid, a third electrode having the form of a perforated conductor positioned across said conduit at the outlet side of said adjacent electrode grids, and means for impressing a potential on said third electrode higher than the potential impressed on said discharging electrode.

3. In processes for the conversion of petroleum hydrocarbons employing a solid adsorptive type conversion catalyst in one or more zones of gas-solids contacting, the method of separating suspended finely divided catalyst particles from gas streams which comprises flowing a gas stream containing suspended finely divided catalyst particles through an ionizing electrostatic field between a grounded non-discharging electrode and a discharging electrode, said discharging electrode having impressed thereon a potential sufficiently high to produce corona discharge and to ionize the gas stream whereby the solid particles have an electric charge imparted to them, then flowing the gaseous stream containing charged particles in suspension through a perforated third electrode having an impressed potential of like polarity to the charge on the solid particles and higher than the potential impressed at the discharging electrode, whereby the electrostatic field generated by the third electrode causes the charged particles to be repelled and returned to a gas-solids contacting zone.

4. In processes for the conversion of petroleum hydrocarbons with a finely divided solid adsorptive type catalyst wherein a body of the catalyst particles is contacted with a gas phase reactant and maintained thereby in a fluidized state in a gas-solids contacting zone from which a stream of gas phase reaction products is continuously withdrawn, the method of separating finely divided particles from suspension in the gas stream which comprises flowing the gas stream containing suspended finely divided catalyst particles through an ionizing electrostatic field between a grounded non-discharging electrode and a discharging electrode, said discharging electrode having impressed thereon a potential sufficiently high to produce corona discharge and to ionize the gas stream whereby the solid particles have an electric charge imparted to them, then flowing the gaseous stream containing charged particles in suspension through a perforated third electrode having an impressed potential of like polarity to the charge on the solid particles and higher than the potential impressed at the discharging electrode, whereby the electrostatic field generated by the third electrode causes the charged particles to be repelled and returned to a gas-solids contacting zone.

5. In processes for the conversion of petroleum hydrocarbons with a finely divided solid adsorptive type catalyst wherein a suspension of catalyst particles in a gas phase reactant is flowed as a stream through an elongated reaction zone and a gas stream of reaction products is separated from the suspension, the method of separating the catalyst particles from suspension in the gas stream which comprises flowing the gas stream containing suspended finely divided catalyst particles through an ionizing electrostatic field between a grounded non-discharging electrode and a discharging electrode, said discharging electrode having impressed thereon a potential sufficiently high to produce corona discharge and to ionize the gas stream whereby the solid particles have an electric charge imparted to them, then flowing the gaseous stream containing charged particles in suspension through a perforated third electrode having an impressed potential of like polarity to the charge on the solid particles and higher than the potential impressed at the discharging electrode, whereby the electrostatic field generated by the third electrode causes the charged particles to be repelled and dropped from suspension in the gas stream.

6. In processes for the conversion of petroleum hydrocarbons with a finely divided solid adsorptive type catalyst wherein a suspension of catalyst particles in a gas phase reactant is flowed as a stream through an elongated reaction zone and a gas stream of reaction products is separated from the suspension, the method of separating the suspension which comprises changing the direction of the path of flow in a manner promoting gravitational separation, withdrawing the gas stream containing suspended finely divided catalyst particles through an ionizing electrostatic field between a grounded non-discharging electrode and a discharging electrode, said discharging electrode having impressed thereon a potential sufficiently high to produce corona discharge and to ionize the gas stream whereby the solid particles have an electric charge imparted to them, then flowing the gaseous stream containing charged particles in suspension through a perforated third electrode having an impressed potential of like polarity to the charge on the solid particles and higher than the potential impressed at the discharging electrode, whereby the electrostatic field generated by the third electrode causes the charged particles to be repelled and dropped from suspension in the gas stream.

7. An apparatus for contacting finely divided catalyst particles with a gaseous medium which comprises a chamber having an inlet in the lower portion thereof for introduction of a gaseous suspension of finely divided catalyst particles to the chamber and having an overhead gas outlet, a discharging electrode grid positioned across the upper portion of the chamber, a non-discharging electrode grid positioned across said chamber adjacent to said discharging electrode grid and grounded to said chamber, means for impressing a high potential on said discharging grid, a third electrode having the form of a perforated conductor positioned across the gas outlet opening from said chamber and insulated therefrom, means for impressing a potential on said third electrode higher than the potential impressed on said discharging electrode.

8. A reactor for contacting a fluidized bed of finely divided catalyst particles with a petroleum hydrocarbon which comprises a chamber having an inlet in the lower portion thereof for introduction of a suspension of finely divided catalyst particles in a vaporized petroleum hydrocarbon and having an overhead vapor product outlet, a discharging electrode grid positioned across the upper portion of the chamber, a non-discharging electrode grid positioned across said chamber adjacent to said discharging electrode grid and grounded to said chamber, means for impressing a high potential on said discharging grid, a third electrode having the form of a perforated conductor positioned across the product outlet opening from said chamber and insulated therefrom, means for impressing a potential on said third electrode higher than the potential impressed on said discharging electrode.

9. A regenerator for contacting a fluidized bed of finely divided catalyst particles with an oxidizing gas which comprises a chamber having an inlet in the lower portion thereof for introduction of a suspension of finely divided catalyst particles in an oxidizing gas and having an overhead flue gas outlet, a discharging electrode grid positioned across the upper portion of the chamber, a non-discharging electrode grid positioned across said chamber adjacent to said discharging electrode grid and grounded to said chamber, means for impressing a high potential on said discharging grid, a third electrode having the form of a perforated conductor positioned across the flue gas outlet opening from said chamber and insulated therefrom, means for impressing a potential on said third electrode higher than the potential impressed on said discharging electrode.

10. A reactor for contacting a suspension of finely divided catalyst particles with a vaporized petroleum hydrocarbon which comprises an elongated tube having an inlet at the lower end thereof for introduction of a suspension of finely divided catalyst particles in a vaporized petroleum hydrocarbon and having an overhead vapor product outlet, a catalyst separation chamber at the outlet of said tube, a discharging electrode grid positioned across the upper portion of the chamber, a non-discharging electrode grid positioned across said chamber adjacent to said discharging electrode grid and grounded to said chamber, means for impressing a high potential on said discharging grid, an overhead outlet in said chamber, a third electrode having the form of a perforated conductor positioned across the outlet opening from said chamber and insulated therefrom, means for impressing a potential on said third electrode higher than the potential impressed on said discharging electrode.

11. A reactor for contacting a suspension of finely divided catalyst particles with a vaporized petroleum hydrocarbon which comprises an elongated tube having the form of an inverted U, an inlet at one lower end of the tube for introduction of a suspension of finely divided catalyst particles in a vaporized petroleum hydrocarbon, an overhead vapor product outlet in said tube, an outlet for separated catalyst at the other lower end of said tube, a discharging electrode grid positioned across said overhead outlet, a non-discharging electrode grid positioned across said outlet adjacent to said discharging electrode grid and grounded to said tube, means for impressing a high potential on said discharging grid, a vapor take-off line leading from said overhead outlet, a third electrode having the form of a perforated conductor positioned across the vapor take-off line leading from said tube and insulated therefrom, means for impressing a potential on said third electrode higher than the potential impressed on said discharging electrode.

References Cited in the file of this patent

UNITED STATES PATENTS

| | | |
|---|---|---|
| 1,343,285 | Schmidt | June 15, 1920 |
| 2,437,352 | Fragen | Mar. 9, 1948 |
| 2,439,811 | Jewell | Apr. 20, 1948 |
| 2,634,818 | Wintermute | Apr. 14, 1953 |